United States Patent [19]

Clampitt

[11] 4,072,191

[45] Feb. 7, 1978

[54] FIRE FLOOR PROCESS

[75] Inventor: Richard L. Clampitt, Bartlesville, Okla.

[73] Assignee: Phillips Petroleum Company, Bartlesville, Okla.

[21] Appl. No.: 725,305

[22] Filed: Sept. 21, 1976

Related U.S. Application Data

[63] Continuation-in-part of Ser. No. 586,465, June 12, 1975, abandoned.

[51] Int. Cl.² .................... E21B 43/24; E21B 33/138
[52] U.S. Cl. .................................... 166/261; 166/292
[58] Field of Search ............... 166/261, 256, 258, 269, 166/272, 292

[56] References Cited

U.S. PATENT DOCUMENTS

| 3,115,929 | 12/1963 | Emery | 166/261 |
|---|---|---|---|
| 3,152,638 | 10/1964 | Geffen et al. | 166/256 X |
| 3,208,519 | 9/1965 | Moore | 166/261 |
| 3,269,460 | 8/1966 | Hardy et al. | 166/269 X |
| 3,369,601 | 2/1968 | Bond et al. | 166/261 X |
| 3,412,793 | 11/1968 | Needham | 166/272 X |
| 3,448,807 | 6/1969 | Strickland, Jr. | 166/256 |
| 3,464,491 | 9/1969 | Froning | 166/261 |
| 3,502,372 | 3/1970 | Prats | 166/261 X |
| 3,504,745 | 4/1970 | Elkins | 166/261 |
| 3,905,553 | 9/1975 | Bradley et al. | 166/261 X |

Primary Examiner—Stephen J. Novosad

[57] ABSTRACT

In an underground in situ combustion process for the recovery of oil from formations having high permeabilities, after combustion has been initiated, water containing a surfactant and air are injected under conditions such that the water upon contact with the hot formation vaporizes, creating slugs of condensible foam in an amount sufficient to generate a significant resistance factor of at least 5, which improves volumetric sweep efficiency by retarding the mobility of the steam and subsequent slugs of air. Air and water, including a surfactant, can be injected simultaneously as a mixture or as alternate slugs of water containing a surfactant and air.

9 Claims, No Drawings

FIRE FLOOR PROCESS

This application is a continuation-in-part of my copending application having Ser. No. 586,465, filed June 12, 1975, entitled "Improved Fire Flood Process," now abandoned.

This invention relates to an improved method for conducting underground combustion operations. The invention is applicable to direct or counterflow in situ combustion processes for the recovery of oil from consolidated, partially consolidated, and unconsolidated formations having permeabilities of at least 2 Darcys. In accordance with another aspect, this invention relates to an improved underground combustion process by injecting a noncombustible liquid, such as water, containing a surfactant and alternate slugs of air during forward combustion, whereby sufficient condensible foam containing steam as the gaseous phase is formed upon contacting of the hot formation with water to generate a significant resistance factor of at least 5, thus selectively blocking and plugging permeable sections of the subterranean oil-bearing formation, thereby resulting in an increase or improvement in the volumetric sweep efficiency. In accordance with another aspect, this invention relates to an improved method for conducting underground combustion operations by injecting water containing sufficient surfactant together with air during forward combustion under conditions to form sufficient condensible or self-collapsing foam having as its gaseous phase steam to generate a significant resistance factor of 5 to 10 or greater which is formed upon water contacting the hot formation, resulting in the selective blocking and plugging of the more permeable sections of the subterranean formation. In accordance with a further aspect, this invention relates to an improved method for recovering oil from subterranean formations being subjected to direct or counterflow in situ combustion processes by injecting a noncombustible liquid, such as water, containing sufficient surfactant together with air or an oxygen-containing gas or by means of injecting alternate slugs of water containing sufficient surfactant and air during forward combustion to improve the volumetric sweep efficiency by retarding the mobility of the steam generated upon water contacting of the hot formation and produce a self-collapsing foam which will generate a significant resistance factor of at least 5.

It is known in the art to combine forward combustion and water flooding by using alternate slugs of water and air in the in situ combustion process once the combustion has been started with air or oxygen injection. In the prior art process the water is injected after the air, with the water becoming vaporized upon contact with the formation to create a large volume of steam, thereby requiring less air for operation of the process than would normally be needed if no water were present or used. The water, upon contacting the hot formation, flashes into steam, and the steam thus generated moves forward together with vaporized and liquid hydrocarbons through the reservoir. In the counterflow process, using the principles of the prior art process, the water in the air becomes vaporized and pushes the oil vapors into the production well. It is also known to add small amounts of surfactant to create foam in such operations, but the amount of foam produced is insufficient to plug the more permeable zones and insufficient to increase the resistance factor a significant amount.

The present invention is directed to an improved mode of operation for the prior art combined forward combustion and water flooding process for the recovery of oil from highly permeable reservoirs in that the slugs of water will contain a sufficient amount of a surfactant to produce a foam in situ having a relatively high, significant resistance factor when the water becomes vaporized or it contacts free gas which will generate foam in situ. The water in which the surfactant is placed initially vaporizes causing the condensible foam to be produced when a surfactant is present. This foam increases the volumetric sweep efficiency of the fire flood, and the foam generated in situ will retard the mobility of the steam vapor and improve the reservoir sweep efficiency.

The use of alternate slugs of air and water, and possibly some slugs of air containing water where surfactants are added to the water slugs, etc., is the preferred way to to carry out the invention. Once in situ combustion has been established in a reservoir, generation of foam in situ can be started with this process to improve overall sweep efficiency. Combustion gases can be added to the air if required or desired.

Accordingly, an object of this invention is to provide an improved method for the production of oil from a highly permeable oil-bearing formation or stratum being subjected to underground combustion operations.

It is another object of this invention to increase the efficiency of oil recovery from such a formation.

Another object of this invention is to provide a method for temporarily or partially plugging the more permeable strata.

It is a further object of this invention to provide a process for producing a well by selectively blocking and plugging highly permeable sections of subterranean oil-bearing formations with a self-destructive foam generated in situ exhibiting a significant resistance factor.

Other objects, aspects, and the several advantages of the invention will be apparent to those skilled in the art upon reading this specification and the appended claims.

In accordance with the invention set forth in said copending application, the above and other objects of the invention are accomplished by forming in situ steam and a condensible foam having steam as the gaseous phase in subterranean oil-bearing formations while conducting direct or counterflow in situ underground combustion operations.

In accordance with one embodiment of said copending application, the invention is carried out by injecting a noncombustible liquid, such as water, containing a surfactant together with air or an oxygen-containing gas or by means of injecting alternate slugs of water containing a surfactant and air during forward combustion whereby foam having steam as the gaseous phase is produced when the water becomes vaporized upon contacting the hot formation.

In accordance with another embodiment of the invention set forth in said copending application, an improved method is provided for conducting counterflow combustion in a reservoir by first igniting the formation to form a combustion zone near a production well, maintaining said combustion zone while forming it through the reservoir toward the injection well and then injecting into the reservoir at the injection well either a mixture of air and a noncombustible fluid, such as water, containing a surfactant or by alternately injecting air and a noncombustible fluid, such as water, containing a surfactant and recovering fluids resulting from the combustion process through a producing well.

In accordance with the present invention, it has now been found that in the recovery of oil from formations having permeabilities of at least two Darcys that a higher concentration of surfactant is required than previously thought in order to generate a significant resistance factor of 5 to 10 or greater. Specifically, it has been found that at least about two weight percent surfactant is required to produce a self-collapsing foam having a significant resistance factor of 5 to 10 or greater.

As used herein, the term "resistance factor" is defined as ($\Delta$ P for surfactant + nitrogen./$\Delta$ P for water + nitrogen)

The resistance factor, to be called a "significant resistance factor," is 5 to 10 or greater, as can be measured by those skilled in the art by comparative core displacement tests in the laboratory, or through the use of pressure fall-off techniques in oil wells.

In actual operation, the surfactant forms a self-collapsing foam having a condensible gas as its gaseous phase and therefore functions to selectively block and plug permeable sections of the subterranean oil-bearing formations. The self-collapsing foam produced increases the volumetric sweep efficiency of the fire flood as it retards the mobility of the steam vapor and thus improves the reservoir sweep efficiency.

The process of the invention is generally applicable to any reservoir in which an ordinary forward-burning process can be conducted including consolidated, partially consolidated, and unconsolidated formations. Reservoirs of this type generally have a minimum permeability of about 20 to 50 millidarcys and the oil contained therein has a minimum viscosity of about 3 to 5 cps at reservoir conditions. As indicated above, the present invention is particularly applicable to formations having permeabilities of at least two Darcys and formations having permeabilities ranging up to about 50 Darcys and greater, generally formation permeabilities ranging from about 2 to about 20 Darcys.

The process comprises first igniting the reservoir at or near an injection well or wells or a production well or wells in a known manner such as, for example, by means of a gas such as air or a liquid-fuel burner, an electrical heater, or the use of suitable pyrophoric materials, a thermite bomb, or the like. When the reservoir immediately surrounding the wellbores is brought to ignition temperature, air or an equivalent oxygen-containing gas is injected in an amount sufficient to establish a definite combustion zone or front. When the front is formed in this manner, temperatures of the order of 1000° to 2,500° F are generated.

After the reservoir has been ignited and a combustion zone or front has been established, water containing at least about two weight percent surfactant is injected into the formation and then contacts the front, resulting both in vaporization of the water, generating steam, and a sufficient amount of self-condensing foam having steam as its gaseous phase to generate a significant resistance factor of at least 5, and cooling of the reservoir rock at the point of vaporization. The generated steam moves forward together with the vaporized and liquid hydrocarbons through the highly permeable reservoir. The self-collapsing foam formed tends to temporarily plug the more permeable portions of the formation and thereby diverts steam into less permeable and producing sections, resulting in an improvement in the overall efficiency of the recovery process.

After injection of the water and surfactant, air or other oxygen-containing gas is introduced into the reservoir to develop another high-temperature front in the vicinity of the reservoir rock just heated as a result of the condensation of steam. Water containing surfactant injection is then resumed, and air injection is stopped. These cycles are repeated until the combustion front reaches the producing well or wells.

As indicated hereinbefore, the instant invention can be employed by the simultaneous injection of air and a noncombustible fluid such as water containing a surfactant at either an injection well or a producing well in the case of counterflow in situ combustion processes. Also as indicated hereinbefore, alternate slugs of water containing a surfactant and air can be injected either at an injection well to forward combustion process or through an injection well in a counterflow in situ combustion process after the combustion front is moved from the production well to the injection well area.

In order to obtain the benefits of the invention, it is desirable to control the air-water ratio used. Generally speaking, the injected air-water ratio can vary from about 300 to about 15,000 scf/bbl.

In accordance with said copending application, the amount of surfactant present in the water injected into the formation ranges from about 0.5 to about 6 weight percent which will ordinarily be sufficient to selectively block and plug permeable sections of subterranean oil-bearing formations with a self-destructive foam generated in situ. The amounts of surfactant, e.g., 1 percent by weight in the specific example, disclosed in said copending application can be varied to generate more or less foam to provide the desired resistance to flow effects in situ, thereby improving the overall volume of reservoir swept during the application of the combustion process in comparison with the known prior art processes.

In accordance with the present invention, it now has been found that in order to effectively recover oil from formations having permeabilities of at least 2 Darcys with a fire flood system, the amount of surfactant present will be at least about two weight percent so as to produce a self-collapsing foam in an amount sufficient to generate a resistance factor of at least 5. At the present time it is preferred to use at least 4 weight percent surfactant. Although amounts of about 6 weight percent can be used, it is preferred to use about 4 to about 10 weight percent surfactant. Even though concentrations of surfactant higher than 10 weight percent can be used, these generally are not economical.

Various types of surface-active agents could be used in the process of my invention, either nonionic, anionic, or cationic. Commercial surface-active agents of the alkyl phenoxy polyethoxy ethanol class and commonly available household cleansers have been tested and found satisfactory in the practice of my invention. The surfactants must be stable at the operating conditions of this invention. For example, Trend detergent, manufactured by Purex Corporation, Ltd., has proved satisfactory, as well as other household cleaning compounds, hand and laundry soaps, and rug shampoos. Another suitable surfactant or liquid detergent that can be used is known commercially as "OK Liquid," marketed by the Proctor and Gamble Company. "OK Liquid" is an ammonium (alkylpoly-oxethylene) sulfate containing organic builders and is described in U.S. Pat. Nos.

2,941,950 and 3,330,346, incorporated herein by reference.

Other water-soluble surfactants which have been found stable at temperatures used to carry out this invention are alkylphenoxypoly(ethyleneoxy)ethanol surfactants sold by GAF Corporation, Chemical Division, 140 West 51st, New York, NY 10020, as Igepal surfactants. The particular Igepal surfactants are sold under the trade names as DM970, DM730, DM710, and CA720. The aliphatic polyether surfactants sold by the GAF Corporation under the trade names Antarax BL330 and BL344 have also been found to be effective water-soluble surfactants usable in carrying out this invention.

Surfactants have been used to produce foams in formations. *Society of Petroleum Engineers Journal,* Dec. 1970: S. H. Raza, "Foam in Porous Media: Characteristics and Potential Applications." Note FIG. 2 and pages 330 and 335. A surfactant solution useful in the present invention is OK Liquid (ammonium lauryl sulfate plus amide builder, manufactured by Proctor and Gamble) in a water solution at a concentration as low as approximately 0.3 weight percent. Such solutions are referred to in the *Society of Petroleum Engineers Journal* as useful to produce foam in porous media.

The following calculated example will serve to further illustrate the invention.

EXAMPLE I

The following example illustrates how this invention can be used to recover additional oil from an oil-containing reservoir.

| Given: | Initial reservoir conditions at start of in situ combustion process with foam generated in situ: |
|---|---|
| Top of Reservoir Depth | 3000 feet |
| Producing Zone Thickness | 40 feet |
| Type of Formation | Sandstone (stratified) |
| Average Porosity | 30 percent |
| Permeability Range | 200 to 2800 millidarcys |
| Dykstra Parsons Permeability Variation ($K_v$) | 0.8 |
| Initial Oil Saturation | 0.65 (fraction of pore space) |
| Initial Brine Saturation | 0.34 " |
| Oil Gravity | 18° API |
| Oil Viscosity in situ | 65 centipoises |
| Brine Viscosity in situ | 0.5 centipoise |
| Initial Formation Temperature | 130° F |
| 5-Acre Well Spacing | |
| 5-Spot Normal Patterns | |
| Size of Project Area | 90 acres |
| Open Hole Completions | All wells |

Steps for Conducting Process:

1. Into each of the injection wells begin injecting air at a rate of 0.5 to 1.0 million standard cubic feet per day. Using a downhole electric heater initiate combustion in the formation at the injection wellbore. Inject sufficient cumulative air to propagate the combustion zone to a radial distance of at least 25–40 feet from the wellbore.

2. Begin injecting alternate slugs of water interspersed with slugs of air into each of the injection wells. Include with the water slugs a surfactant, such as Proctor and Gamble's "OK Liquid," at a concentration of 1.0 percent based upon the weight of the water. The sequence to be injected follows:

a. After step (1), inject 500 barrels of water containing 1 percent of the surfactant.
 b. Inject a 5 pore volume percent slug of air. (The volume of air to be injected is calculated at the average reservoir temperature and pressure.)
 c. Inject a slug of water containing 1 percent surfactant, and the size of the water slug is such to provide an air-water ratio of 1,000 cubic feet per barrel and is the ratio of cumulative air volume injected (SCF) in step (b) divided by the cumulative water volume (barrels) in step (c).
 d. Repeat step (b).
 e. Repeat step (c).
 f. Repeat step (b), but during air injection begin simultaneously injecting some water so that the ratio of air to water is 20,000 SCF/barrel. Include surfactant with the water at the same concentration as in step (a).

The different steps shown above should be repeated until the combustion zone is driven across each pattern to the offset producing wells. The injected air rates and water rates can be adjusted to control produced gas to fluid ratios and temperatures at the offset producing wells. It is apparent that not every water slug has to contain surfactant and that the concentration of the surfactant, when used, can be varied to generate more or less foam in situ to provide the desired resistance to flow effects in situ. The use of the foam will improve the overall volume of the reservoir swept during the application of the combustion process.

EXAMPLE II

Foam tests were made by charging fresh water solutions of disodium ethoxylated nonyl phenol half ester of sulfosuccinic acid, supplied by American Cyanamide Company as their Aerosal A103, to sand packs contained in a steel cell. The cell, of schedule 40 pipe, was 2.8 cm in diameter and 29.2 cm in length. Provisions were made to introduce nitrogen gas into the flowing liquid stream before the mix entered the bottom of the sand pack. All the tests reported herein were made with liquid flow rates of 220 cc/hr. and the nitrogen or $CO_2$ (one run) was 2100 cc/hr. A small volume Milton Ray Duplex pump was used in the tests, one cylinder pumping water and the other the surfactant solution. Four channels of a Gulton recorder having transducer ranges of 0–10, 0–50, 0–100, and 0–200 psi were used to monitor pressure drop across the sand pack. Nitrogen or $CO_2$ (one run using $CO_2$) was supplied from cylinders of the compressed gases through regulators and a rotameter with fine needle valve control. Gas pressure on the system was limited to 200 psi because of limitation of rotameter construction. The one $CO_2$ test reported was made at 60 psi.

Test Procedure:

1. Pack tube with sand using an electric vibrator to settle the sand. Tube was supported in a vertical position during test.

2. Connect pumping systems to bottom of tube, fill pack with water, and measure pack permeability.

3. Start full flow of water, 220 cc/hr., using both pumps, and measure pressure drop; introduce 2100 cc $N_2$/hr., and measure pressure drop; connect surfactant side of pump to surfactant supply and finally measure pressure drop after maximum foam generation has been reached, indicated by maximum pressure drop across tube. Resistance factor is defined as the ($\Delta$ P for surfactant + $N_2$/$\Delta$ P for water + $N_2$.)

Surfactant solution is prepared to make 110 cc with enough surfactant to yield desired concentration in total pump discharge of 220 cc.

4. Complete test, using transducers of the proper pressure range. As the pressure drop increases, the low range transducers are removed from the system to prevent overrange damage.

5. At test conclusion, test lines were flushed before proceeding with the next test.

Results:

Test data are summarized below in Table I. Resistance factors, sand pack permeability, and sand identity are presented. A greater than (<) sign indicates that the nitrogen flow was completely blocked for that test and the numerical value is maximum pressure (200 psi) divided by pressure drop for water-nitrogen flow. It was necessary to use sands with a range of permeabilities (different sands) in order to cover desired range of surfactant. Permeability is determined by Darcy's equation (see U.S. Pat. No. 3,727,687, column 13) wherein K is calculated.

In Table I, resistance factors for various concentrations of surfactant A103 in Bartlesville, Okla., tap water and sand packs of different sands having different permeabilities; 220 cc/hr. liquid flow; and 2100 cc/hr. $N_2$ gas flow have been determined.

TABLE I

| Test Number | Sand in Pack | % A103 Surfactant in Water | Permeability K in Darcys Before Tests | Resistance Factor |
|---|---|---|---|---|
| TABLE A: | | | | |
| 1 | Mill Creek | 2 | 2.2 | 4.20 |
| 2 | Mill Creek | 2 | 4.2 | 1.49 |
| 3 | Mill Creek | 4 | 5.1 | 1.10 |
| 4 | Mill Creek | 4 | 5.1 | 1.68 |
| 5 | Mill Creek | 4 | 3.0 | >37.0 |
| 6 | Mill Creek | 6 | 4.2 | 8.6 |
| 7 | Mill Creek | 6 | 3.0 | >33 |
| 8[a] | Mill Creek | 6 | 6.2 | >89 |
| TABLE B: | | | | |
| 9 | Ottawa | 4 | 24.0 | 2.0 |
| 10 | Ottawa | 8 | 16.0 | 71.0 |
| 11 | Ottawa | 10 | 16.0 | 113.0 |
| TABLE C: | | | | |
| 12[b] | Nocatoch Outcrop Sand | 2 | 7.4 | 1.6 |

[a] >60 mesh function used (>60 cut retained on screen, below 60 passes through screen).
[b] Test made using $CO_2$ as the gas instead of nitrogen.

The resistance factor as defined herein, developed by a surfactant-stabilized foam flowing through a porous media, is found to be dependent upon surfactant concentration and media permeability. At a constant rate of liquid and gas flow, higher resistance factors will be developed in packs of lower permeability. Under the same flow conditions, a large bubbled foam is generated with low surfactant concentrations and high permeability. Smaller bubbled foams with higher resistance factors may be generated in packs of high permeability by increasing surfactant concentration.

Referring to Table I, for a given concentration of surfactant, say, 2 percent, as the permeability increases from 2.2 Darcys to 4.2 Darcys, the data from the sandpack tests show the resistance factor decreases from 4.2 to 1.49, as shown in Table A. In the 3 to 5 Darcy permeability region, the resistance factor decreased from <37 in a 3 Darcy sandpack to about 1.5 Darcys when using 4 percent of A103 surfactant in the water solution in a Mill Creek sandpack. This shows the effect of permeability.

At a given permeability, the data show that when the concentration of the surfactant is increased the resistance factor becomes greater. This is due to a combination of factors, such as an increase in the film toughness, film viscosity, and a reduced liquid drainage rate on the surface of the foam bubbles. This points out that in any reservoir it is necessary to conduct laboratory tests to locate the optimum concentration of surfactant in the liquid solution which would produce a resistance factor of at least 5.

In situ foam diversion projects where the resistance factors are between 1 and 2 will probably be unsuccessful. Resistance factors of the order of 1 to 2 suggests the foam has either collapsed or has insufficient toughness and strength, and in a real situation it would be an ineffective diversion system. The level of resistance factor is readily known to be directly relatable to the effective mobility of fluids in a porous media.

EXAMPLE III

Pressure drops and foam quality has been determined on the surfactant Aerosal A102 in Bartlesville, Okla., tap water at concentrations of 0.2, 3, and 6 volume percent. Aerosal A102 is a dialkyl ester of sodium sulfosuccinic acid supplied by American Cyanamide Co., Industrial Chemicals and Plastics Div., Berdan Ave., Wayne, N.J. 07470, and was chosen for the example surfactant since solutions are easily prepared and previous tests indicate that it is effective in foam-oil recovery processes.

A surfactant solution is pumped through a sand pack at a fixed rate while nitrogen is added, also at a fixed rate, and the pressure drop across the sand pack is a measure of foam resistant effectiveness. In these tests the sand pack was 2.67 × 28 cm of a medium grade Ottawa sand having a permeability of about 30 Darcys. Liquid flow rate through the pack was 131 cc/hr., and nitrogen flow was 1400 cc/hr. Pack pore volume was 57 cc. Pressure transducers having ranges of 0–10 psi, 0–50 psi, 0–100 psi, and 0–200 psi were used in ΔP measurements. Transducer outputs were recorded on a Gulton channel recorder, Model TR 888 having a chart speed of 0.5 mm/minute.

Test Procedure:
1. Pressure drop for 131 cc/hr. tap water across pack was determined.
2. Pressure drop for 131 cc/hr. tap water + 1400 cc $N_2$/hr. was determined.
3. Pressure drop for 131 cc/hr. of test solution + 1400 cc $N_2$/hr. was determined. Experimental data are summarized in Table II.

TABLE II

Pressure drops across a 30 Darcy sand pack for Aerosal A102 solutions with concurrent nitrogen flow.

| | Pressure Drop Across Sand Pack, psig | | |
|---|---|---|---|
| (a) Water | (b) Water + $N_2$ | (c) Test Solution + $N_2$ | |
| 0.2[b] | 0.7 | 0.2% Aerosal A102, | 1.0 |
| 0.2 | 0.5 | 3% Aerosal A102, | 1.1 |
| 0.7 | 1.3 | 6% Aerosal A102, | 65.0 |

Pack was flushed with water overnight for a second test of the 3% Aerosal A102 solution:

| 0.3 | 4.5[a] | 3% Aerosal A102, | 80.0[a] |
|---|---|---|---| a. After subjecting the sand pack to high concentrations of surfactant, thorough washing does not completely remove surfactant. Note that a second test of 3% surfactant results in higher pressure drops than was obtained by previous 6% solution.
b. Pressures below 10 psi were measured with the 0–10 psi range transducer, and those above 10 psi were measured with the 0–100 psi transducer.

The tests in Table II were made all on one core with the core being flushed with tap water about two hours between tests. It might be considered that there are four sets of tests with the first test going horizontally across Table II from left to right where the pressure drop for water alone going through sand pack is measured, then the pressure drop of water flowing at a fixed rate plus nitrogen going through the sand pack, and last a 0.2% Aerosal A102 solution in water plus nitrogen going through the sand pack. The core was flushed 2 hours with water between each test.

The test for 6% Aerosal A102 solution showed a pressure drop of 65.0 psig. Since pressure drop for 3% Aerosal A102 in the second test was only 1.1 psig, another test was run after the pack was flushed with water overnight. In this last test (fourth test), using 3% Aerosal A102 solution, the pressure drop was 80 psig, indicating that some of the surfactant had not been removed even though the sand pack had been flushed overnight with water. The test indicate that the higher the percent surfactant being used, the more pressure drop is to be expected, while with a 0.2% Aerosol A102 in the solution gave only 0.3 pounds increase (1.0–0.7) in pressure drop over water alone plus nitrogen.

I claim:

1. A process for the recovery of oil from an underground reservoir having a formation permeability value of at least 2 Darcys penetrated at spaced points by an injection well and a production well which comprises:
   a. igniting said reservoir at a point adjoining said injection well to form a combustion front,
   b. propagating the resulting combustion front through said reservoir toward said producing well by injecting through said injection well an oxygen-containing gas, water, and a surfactant at a gas-water ratio of from about 300 to about 15,000 scf/barrel of water and at least 2 weight percent surfactant based on the weight of water injected, said water upon contacting the hot formation vaporizes creating a condensible foam having steam as its gaseous phase, the amount of foam produced being sufficient to generate a resistance factor of at least 5, which foam temporarily plugs more permeable portions of the reservoir and diverts steam into less permeable and producing sections thereby improving the volumetric sweep and overall efficiency of the recovery process by retarding mobility of the steam thus generated, and
   c. recovering oil from said reservoir through said producing well.

2. The process of claim 1 in which the oxygen-containing gas and water are introduced through said injection well as a mixture and the amount of surfactant present ranges from about 4 to about 10 weight percent.

3. The process of claim 1 in which the oxygen-containing gas and water are injected through said injection well in the form of alternate slugs and the amount of surfactant present ranges from about 4 to about 10 weight percent.

4. A process for the recovery of oil from an underground reservoir having a formation permeability value of 2–20 Darcys penetrated at spaced points by an injection well and a production well which comprises:
   a. initiating a zone of combustion in said reservoir at a point adjoining said production well,
   b. injecting an oxygen-containing gas through said injection well to said zone of combustion to maintain said zone and to propagate it through said reservoir toward said injection well until said zone has reached an area adjacent said injection well,
   c. introducing an oxygen-containing gas, water, and a surfactant at a gas-water ratio of from about 300 to about 15,000 scf/barrel of water and at least 2 weight percent surfactant based on the weight of water injected into said reservoir through said injection well to reverse the course of said zone so that it travels concurrently with the injected oxygen-containing gas, water, and surfactant toward said production well, said water upon contacting the hot formation vaporizes creating a condensible foam having steam as its gaseous phase, the amount of foam produced being sufficient to generate a resistance factor of at least 5, which foam temporarily plugs the more permeable portions of the reservoir and diverts steam into less permeable and producing sections thereby improving the volumetric sweep and overall efficiency of the recovery process by retarding mobility of the steam thus generated, and
   d. recovering fluids resulting therefrom through said production well.

5. The process according to claim 4 in which the oxygen-containing gas and water are introduced as a mixture and the amount of surfactant present ranges from about 4 to about 10 weight percent.

6. A process according to claim 4 in which the oxygen-containing gas, water, and surfactant are injected in the form of alternate slugs during the forward combustion step so that the oxygen-containing gas and steam thus generated travel through said reservoir in the same direction as said front and the amount of surfactant present ranges from about 4 to about 10 weight percent.

7. A process according to claim 4 in which said oxygen-containing gas is air and the amount of surfactant injected ranges from about 4 to about 10 weight percent, based upon the weight of the water injected.

8. A process for the recovery of valuable products from a carbonaceous deposit having a formation permeability value of 2–20 Darcys in which forward combustion can be effected without further treatment and wherein said deposit is penetrated at spaced points by an injection well and a production well which comprises:
   a. bringing said deposit at the face of said injection well at ignition temperatures followed by the injection of air to establish a combustion front at the face of said injection well, b. propagating the resulting combustion front through said deposit by injecting through said injection well a mixture of air, water, and a surfactant at a ratio of from about 300 to about 15,000 scf air/bbl of water and from about 4 to about 10 weight percent surfactant based on the weight of water injected so that the water upon contacting the hot formation vaporizes creating a condensible foam having steam as its gaseous phase, the amount of foam produced being sufficient to generate a resistance factor of at least 5, thereby improving the volumetric sweep efficiency by retarding the mobility of the steam thus generated and forcing products of said deposit toward said production well, and c. recovering fluids resulting from the combustion process through said production well.

9. A process for the underground combustion of a carbonaceous deposit having a formation permeability value of 2-20 Darcys penetrated at spaced points by an injection well and a production well which comprises:

a. initiating a zone of combustion therein at a point adjoining said production well, b. thereafter supplying air through said injection well to said zone to maintain said zone and propagate it through said deposit toward said injection well until said zone has reached an area adjacent the injection well, c. subsequently further introducing through said injection well a mixture of air, water, and a surfactant in a ratio of from about 300 to about 15,000 scf air/bbl of water and from about 4 to about 10 weight percent surfactant based on the weight of water injected so that the water upon contacting the hot formation vaporizes, creating a condensible foam having steam as its gaseous phase, the amount of foam produced being sufficient to generate a resistance factor of at least 5, thereby improving the volumetric sweep efficiency by retarding the mobility of the steam thus generated and forcing products of said deposit toward said producing well, leaving a carbonaceous residue in the wake of said front, whereby the course of said zone is reversed and travels concurrently with the injected air and generated steam toward said producing well, and recovering fluids resulting therefrom through said production well.

* * * * *